United States Patent
Ito et al.

(10) Patent No.: US 10,850,466 B2
(45) Date of Patent: Dec. 1, 2020

(54) DYNAMIC BALANCE DEVICE FOR PRESS MACHINE

(71) Applicant: AIDA ENGINEERING, LTD., Kanagawa (JP)

(72) Inventors: Takao Ito, Kanagawa (JP); Tadashi Nishimura, Kanagawa (JP)

(73) Assignee: AIDA ENGINEERING LTD., Kanagawa (JP)

( * ) Notice: Subject to any disclaimer, the term of this patent is extended or adjusted under 35 U.S.C. 154(b) by 399 days.

(21) Appl. No.: 15/735,570

(22) PCT Filed: Jun. 13, 2016

(86) PCT No.: PCT/JP2016/067479
§ 371 (c)(1),
(2) Date: Dec. 11, 2017

(87) PCT Pub. No.: WO2016/204103
PCT Pub. Date: Dec. 22, 2016

(65) Prior Publication Data
US 2020/0031081 A1    Jan. 30, 2020

(30) Foreign Application Priority Data

Jun. 15, 2015 (JP) ................................. 2015-120099

(51) Int. Cl.
*B30B 15/00* (2006.01)
*B30B 15/04* (2006.01)
(Continued)

(52) U.S. Cl.
CPC ........ *B30B 15/0064* (2013.01); *B30B 15/041* (2013.01); *B21D 28/002* (2013.01);
(Continued)

(58) Field of Classification Search
CPC ... B30B 15/0064; B30B 15/041; B30B 1/261; B30B 1/06; B30B 1/28; F16F 15/22; B21D 28/002; B21D 37/08
(Continued)

(56) References Cited

U.S. PATENT DOCUMENTS 4,817,456 A * 4/1989 Imanishi ................. F16F 15/22
                                                    74/604
5,687,645 A * 11/1997 Kato ....................... B30B 1/261
                                                    100/282
(Continued)

FOREIGN PATENT DOCUMENTS

CN   202208113 U  *  5/2012
EP   1 223 027 A2    7/2002
(Continued)

OTHER PUBLICATIONS

English translate (JP2009066643A), retrieved date Feb. 27, 2020.*
(Continued)

*Primary Examiner* — Adam J Eiseman
*Assistant Examiner* — Mohammed S. Alawadi
(74) *Attorney, Agent, or Firm* — .McDermott Will & Emery LLP

(57) ABSTRACT

A dynamic balance device for a press machine includes a plurality of cam portions which transmit a vertical motion of a slide to a balance weight to move the balance weight in a reverse direction of the vertical motion of the slide. The cam portions are each movable in a direction substantially orthogonal to a moving direction of the slide, and each include a first inclined surface and a second inclined surface. The first inclined surface has an inclination angle corresponding to an inclination angle of an inclined surface formed on a member which is provided integrally with the slide and vertically moves with the slide. The second
(Continued)

inclined surface has an inclination angle corresponding to an inclination angle of an inclined surface formed on the balance weight.

5 Claims, 9 Drawing Sheets

(51) Int. Cl.
    *B21D 28/00*     (2006.01)
    *B30B 1/06*     (2006.01)
    *B30B 1/26*     (2006.01)
    *F16F 15/22*     (2006.01)

(52) U.S. Cl.
    CPC .............. *B30B 1/06* (2013.01); *B30B 1/261* (2013.01); *F16F 15/22* (2013.01)

(58) Field of Classification Search
    USPC ............ 100/282; 72/452.5, 452.9, 446–447, 72/455–456
    See application file for complete search history.

(56) References Cited

U.S. PATENT DOCUMENTS

| | | | |
|---|---|---|---|
| 5,881,599 A * | 3/1999 | Sasahara | B21D 28/32 100/266 |
| 6,997,029 B2 * | 2/2006 | Chun | B21D 28/32 72/315 |
| 7,191,635 B2 * | 3/2007 | Chun | B21D 28/32 72/304 |

FOREIGN PATENT DOCUMENTS

| | | | | |
|---|---|---|---|---|
| JP | S51-40665 A | | 4/1976 | |
| JP | H10-006095 A | | 1/1998 | |
| JP | 2001286950 A | * | 10/2001 | |
| JP | 2002137026 | * | 5/2002 | |
| JP | 2002-205197 A | | 7/2002 | |
| JP | 2003094200 A | * | 4/2003 | ......... B30B 15/0035 |
| JP | 2009-066643 A | | 4/2009 | |
| JP | 2009066643 A | * | 4/2009 | |

OTHER PUBLICATIONS

English tanslate (jp 2002137026), retrieved date Feb. 27, 2020.*
English translate (JP2003094200A), retrieved date Feb. 27, 2020.*
English translate (JP2001286950A), retrieved date Feb. 27, 2020.*
English translate (CN202208113U), retrieved date Feb. 27, 2020.*
Search Report issued in corresponding International Patent Application No. PCT/JP2016/067479, dated Aug. 30, 2016.
Office Action issued in corresponding Japanese Patent Application No. 2017-501342, dated Dec. 27, 2017.
Extended European Search Report issued in corresponding European Patent Application No. 16811577.2-1019, dated Mar. 14, 2019.

* cited by examiner

DYNAMIC BALANCE DEVICE FOR PRESS MACHINE

CROSS REFERENCE

This application is the U.S. National Phase under 35 U.S.C. § 371 of International Application No. PCT/JP2016/067479, filed on Jun. 13, 2016, which claims the benefit of Japanese Application No. 2015-120099, filed on Jun. 15, 2015, the entire contents of each are hereby incorporated by reference.

TECHNICAL FIELD

The present invention relates to a dynamic balance device for a press machine.

BACKGROUND ART

A high-speed press machine is provided with a dynamic balance device that reduces mechanical vibration generated during high-speed operation. In related-art dynamic balance devices, as a mechanism for driving a balance weight, there has been employed a crank mechanism (crank and connecting rod) or a link mechanism (for example, knuckle mechanism using crank and lever) (see JP-A-10-6095 and JP-A-2002-205197).

SUMMARY OF INVENTION

Technical Problem

In the related-art dynamic balance devices, in addition to a mechanism for converting a rotational motion of a crank shaft into a vertical motion of a slide, there is provided a crank mechanism or a link mechanism for converting the rotational motion of the crank shaft into a vertical motion of a balance weight. Therefore, there has been a problem in that the press machine is complicated and involves a large number of components, with the result that the press machine becomes expensive. Further, there has been a problem in that increase in the number of support points causes thermal displacement of a bottom dead center position due to slide heat generated at each support point.

The present invention has been made in view of the above-mentioned problems, and has an object to provide a dynamic balance device for a press machine, which enables reduction of cost for manufacture by simplifying a drive mechanism for a balance weight and enables improvement in accuracy of a bottom dead center position by minimizing an influence of thermal displacement.

Solution to Problem (1) According to one embodiment of the present invention, there is provided a dynamic balance device for a press machine which performs press working by converting a rotational motion of a crank shaft into a vertical motion of a slide, the dynamic balance device including a plurality of cam portions which transmit the vertical motion of the slide to a balance weight to move the balance weight in a reverse direction of the vertical motion of the slide, the plurality of cam portions each being movable in a direction substantially orthogonal to a moving direction of the slide, and including: a first inclined surface having an inclination angle corresponding to an inclination angle of an inclined surface formed on the slide or on a member which is provided integrally with the slide and vertically moves together with the slide; and a second inclined surface having an inclination angle corresponding to an inclination angle of an inclined surface formed on the balance weight.

According to the dynamic balance device for a press machine, the plurality of cam portions which transmit the vertical motion of the slide to the balance weight to move the balance weight in the reverse direction to the vertical motion of the slide are provided, thereby being capable of eliminating the need for a crank mechanism or a link mechanism which converts a rotational motion of the crank shaft into a vertical motion of the balance weight, and simplifying the drive mechanism for the balance weight.

(2) In the dynamic balance device for a press machine, the first inclined surface and the second inclined surface may each have a spherical concave portion, and the spherical concave portion may receive a spherical shoe which has a convex lens shape in which one surface being a spherical convex surface and another surface being a flat surface so that the spherical convex surface is held in contact with a spherical surface of the spherical concave portion and the spherical shoe is swingable.

According to the dynamic balance device for a press machine, surface contact between the flat surfaces of the spherical shoes received in the inclined surfaces of the plurality of cam portions and the inclined surfaces against which the flat surfaces are held in abutment (inclined surfaces formed on the slide or on the member which is provided integrally with the slide and vertically moves together with the slide, or the inclined surfaces formed on the balance weight) can be maintained, thereby being capable of preventing seizure and wear of the slide surface due to line contact.

(3) In the dynamic balance device for a press machine, when the slide moves in a first direction, a first cam portion among the plurality of cam portions may move in a second direction which is substantially orthogonal to the first direction, and the balance weight may move in a third direction which is a reverse direction to the first direction. When the slide moves in the third direction, a second cam portion among the plurality of cam portions may move in the second direction, and the balance weight may move in the first direction.

DESCRIPTION OF EMBODIMENTS

Now, detailed description is made of embodiments of the present invention with reference to the drawings.

First Embodiment

Figure 1:
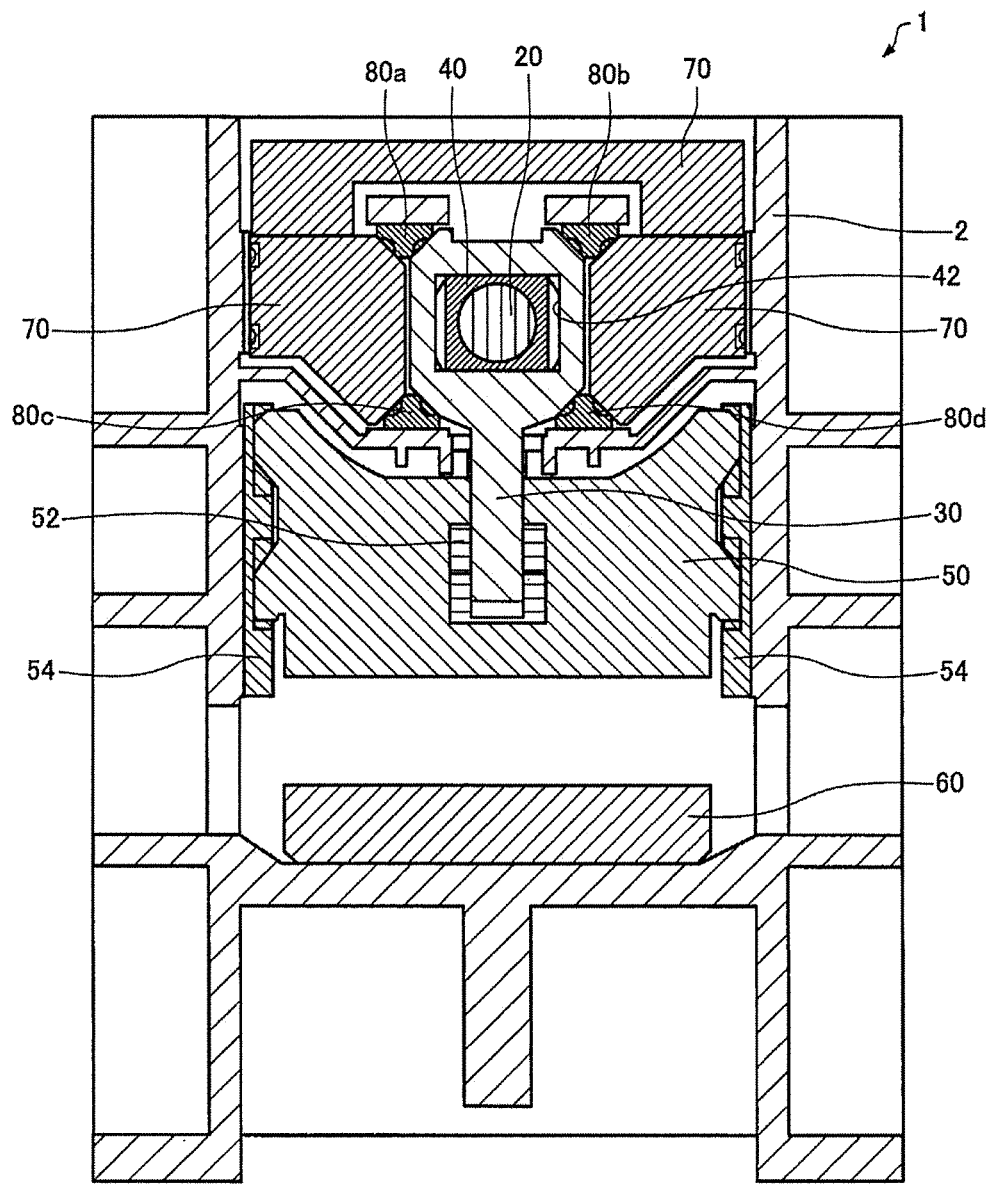
FIG. 1 is a partial sectional front view of a press machine including a dynamic balance device according to a first embodiment of the present invention.
Figure 2:
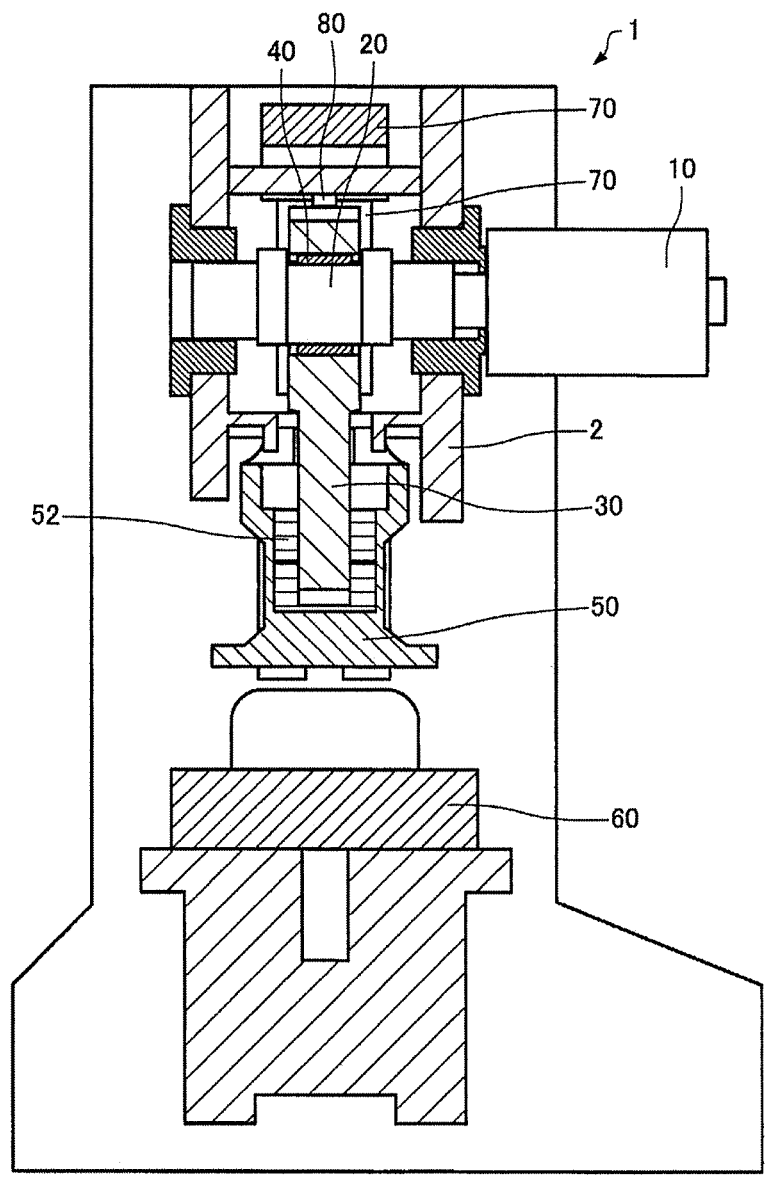
FIG. 2 is a partial sectional side view of the press machine including the dynamic balance device according to the first embodiment.

FIG. 1 is a partial sectional front view of a press machine including a dynamic balance device according to a first embodiment of the present invention. FIG. 2 is a partial sectional side view of the press machine. FIG. 1 is an illustration of a state of a top dead center, and FIG. 2 is an illustration of a state of a bottom dead center.

The press machine 1 converts a rotational motion of a crank shaft 20 into a vertical reciprocating motion (vertical motion) of a slide 50 by a Scotch-yoke mechanism, and is capable of performing press working on a work piece (not shown) with use of the vertical reciprocating motion of the slide 50. Further, the press machine 1 includes a dynamic balance device which moves balance weights 70 in a reverse direction of the vertical motion of the slide 50 to reduce mechanical vibration generated during high-speed operation (about 200 $min^{-1}$ to 1,000 $min^{-1}$).

The press machine 1 includes a servomotor 10, the crank shaft 20, an adjustment screw 30, a slider 40, the slide 50, a bolster 60, the balance weights 70, and a plurality of cam portions 80 (80a to 80d).

The servomotor 10 is not limited to an alternating-current servomotor, for example, a synchronous motor using a permanent magnet as employed in the first embodiment. There may also be employed, for example, an induction motor, a reluctance motor, or a direct-current servomotor. Further, in place of the servomotor 10, there may also be used a flywheel which is driven to rotate by a motor.

The crank shaft 20 is connected to an output shaft of the servomotor 10. The slider 40 is mounted to an outer periphery of the crank shaft 20 (eccentric portion). A hollow slide chamber 42 is formed in the adjustment screw 30. Slide surfaces are formed on both of upper and lower surfaces of the slide chamber 42. The slider 40 is held in contact with the upper and lower slide surfaces in the slide chamber 42, and is inserted so as to be slidable in a horizontal direction. The adjustment screw 30 and a worm wheel 52 construct an adjustment mechanism. The adjustment screw 30 is provided integrally with the slide 50 through intermediation of the worm wheel 52. The slide 50 is provided to a frame 2 so as to be movable in the vertical direction by slide guides 54. When the crank shaft 20 is rotated, the slider 40 performs a circular motion while sliding in the horizontal direction in the slide chamber 42. Therefore, the slide 50 (adjustment screw 30) vertically moves.

The balance weights 70 are provided so as to be movable (slidable) in the vertical direction. The balance weight 70 provided on the left side in FIG. 1 and the balance weight 70 provided on the right side in FIG. 1 are coupled to each other by the balance weight 70 provided on the upper side.

The plurality of cam portions 80 are movable (slidable) in the horizontal direction (direction substantially orthogonal to the moving direction of the slide 50), and transmit the vertical motion of the slide 50 (adjustment screw 30) to the balance weights 70 to move the balance weights 70 in the reverse direction to the vertical motion of the slide 50 (with a phase difference of 180 degrees).

Figure 3A:
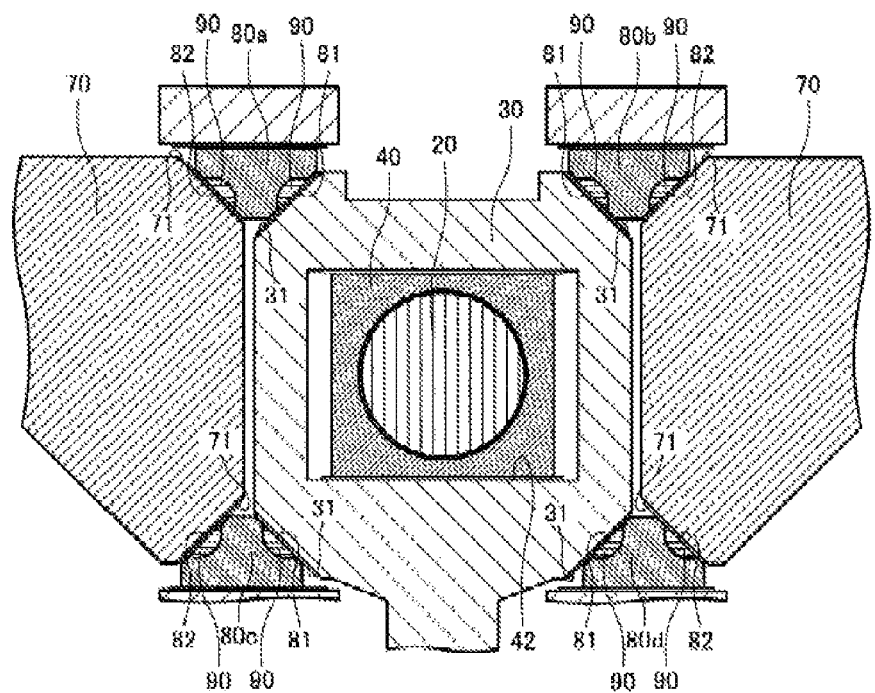
FIGS. 3A, 3B, and 3C are detailed views of main portions of FIG. 1.

FIG. 3A is a detailed view of main portions of FIG. 1. FIG. 3A is an illustration of a state of the bottom dead center. The adjustment screw 30 (one example of a member which is provided integrally with the slide 50 and vertically moves together with the slide 50) has four inclined surfaces 31 opposed to the cam portions 80a to 80d. Two inclined surfaces 71 opposed to the cam portions 80a and 80c are formed on the balance weight 70 provided on the left side in FIG. 3A, and two inclined surfaces 71 opposed to the cam portions 80b and 80d are formed on the balance weight 70 provided on the right side in FIG. 3A. The inclined surfaces 31 and 71 each have a predetermined inclination angle (which is herein 45 degrees) with respect to the moving direction of the slide 50 (vertical direction).

The cam portions 80 each have a first inclined surface 81 and a second inclined surface 82. The first inclined surface 81 is opposed to the inclined surface 31 and has an inclination angle corresponding to an inclination angle of the inclined surface 31 (inclination angle which is substantially equal to the inclination angle of the inclined surface 31). The second inclined surface 82 is opposed to the inclined surface 71 and has an inclination angle corresponding to an inclination angle of the inclined surface 71 (inclination angle which is substantially equal to the inclination angle of the inclined surface 71).

Figure 3B:
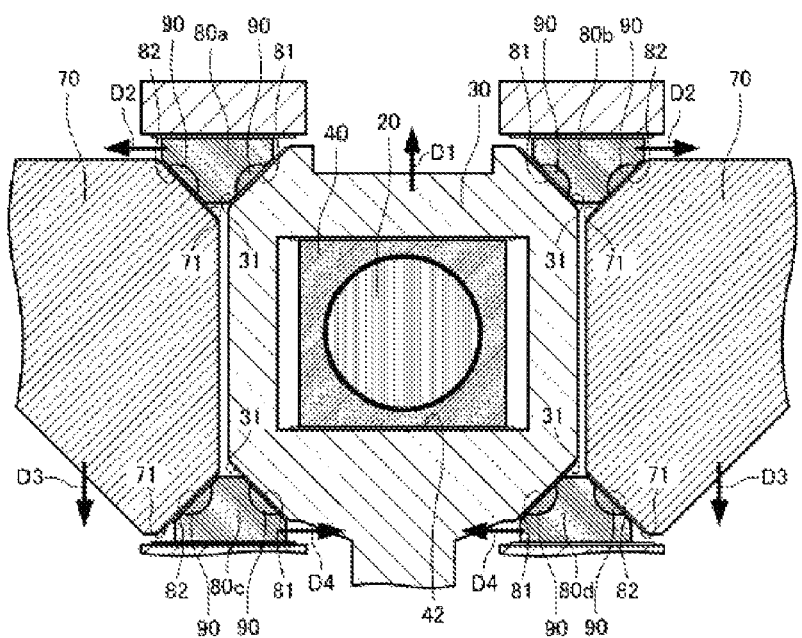

As illustrated in FIG. 3B, when the slide 50 (adjustment screw 30) moves in an upward direction (first direction D1), the first inclined surfaces 81 of the cam portions 80a and 80b (first cam portions) are pressed by the inclined surfaces 31, and the cam portions 80a and 80b move in the horizontal direction (second direction D2, that is, the cam portion 80a moves in the leftward direction in FIG. 3B, and the cam portion 80b moves in the rightward direction in FIG. 3B). Moreover, the inclined surfaces 71 are pressed by the second inclined surfaces 82 of the cam portions 80a and 80b, and the balance weights 70 move in the downward direction (third direction D3). Further, the second inclined surfaces 82 of the cam portions 80c and 80d (second cam portions) are pressed by the inclined surfaces 71, and the cam portions 80c and 80d move in the horizontal direction (fourth direction D4, that is, the cam portion 80c moves in the rightward direction in FIG. 3B, and the cam portion 80d moves in the leftward direction in FIG. 3B).

Figure 3C:
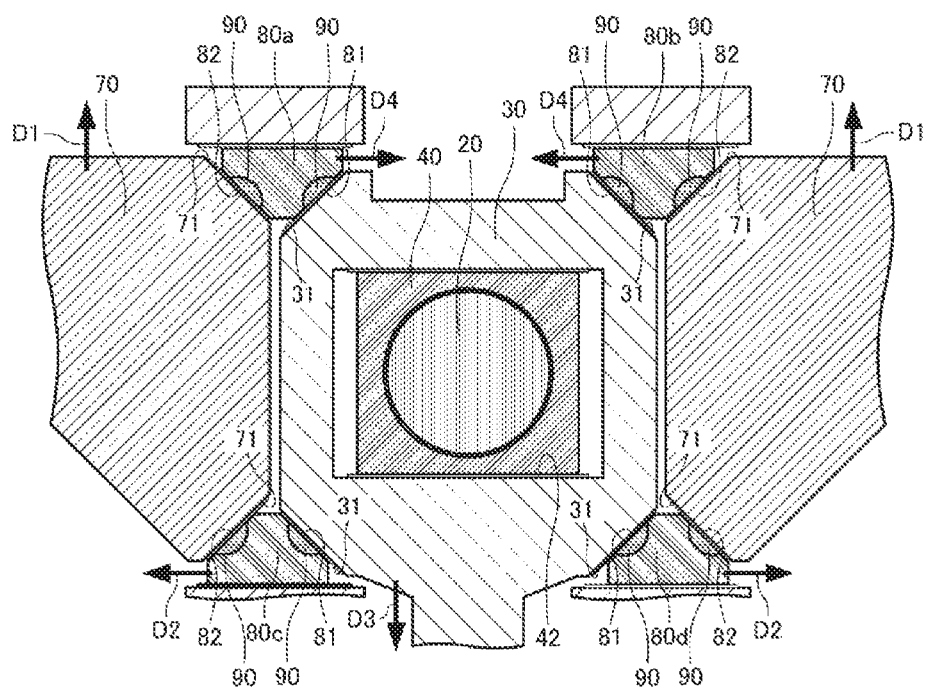

Further, as illustrated in FIG. 3C, when the slide 50 (adjustment screw 30) moves in the downward direction (third direction D3), the first inclined surfaces 81 of the cam portions 80c and 80d (second cam portions) are pressed by the inclined surfaces 31, and the cam portions 80c and 80d move in the horizontal direction (second direction D2, that is, the cam portion 80c moves in the leftward direction in FIG. 3C, and the cam portion 80d moves in the rightward direction in FIG. 3C). Moreover, the inclined surfaces 71 are pressed by the second inclined surfaces 82 of the cam portions 80c and 80d, and the balance weights 70 move in the upward direction (first direction D1). Further, the second inclined surfaces 82 of the cam portions 80a and 80b (first cam portions) are pressed by the inclined surfaces 71, and the cam portions 80a and 80b move in the horizontal direction (fourth direction D4, that is, the cam portion 80a moves in the rightward direction in FIG. 3C, and the cam portion 80b moves in the leftward direction in FIG. 3C).

That is, the inclined surfaces 31 formed on the adjustment screw 30, the inclined surfaces 71 formed on the balance weights 70, and the cam portions 80 cause the vertical motion of the slide 50 (adjustment screw 30) to be converted into the moving force in the reverse direction to the vertical motion, thereby causing the balance weights 70 to vertically move together with the slide 50 with the phase shifted by 180 degrees.

As described above, in the dynamic balance device according to the first embodiment, the plurality of cam portions 80 are used to transmit the vertical motion of the slide 50 to the balance weights 70, thereby moving the balance weights 70 in the reverse direction to the vertical motion of the slide 50. Accordingly, since there is no need for the mechanism which converts the rotational motion of the crank shaft 20 into the vertical motion of the balance weights 70 (crank mechanism or link mechanism), the mechanism which moves the balance weights 70 with the phase difference of 180 degrees with respect to the slide 50 can be simplified (components can be simplified, and the number of components can be reduced). Therefore, cost for manufacture is reduced, and the influence of the thermal displacement is minimized, thereby being capable of achieving the dynamic balance device for a press machine, which enables improvement in accuracy of the bottom dead center position.

In a press machine including a related-art dynamic balance device, both a slide and a balance weight are driven with use of the rotational motion of a crank shaft. Therefore, when the drive mechanism for the slide is complicated, the drive mechanism for the balance weight, which moves the balance weight with the phase shifted by 180 degrees with respect to the slide, is also complicated. Meanwhile, in the dynamic balance device according to the first embodiment, only the slide 50 is driven with use of the rotational motion of the crank shaft 20, and the balance weights 70 are driven by the cam portions 80 with use of the vertical motion of the slide 50. Therefore, the drive mechanism for the balance weights 70 is not complicated even when the drive mechanism for the slide 50 is complicated.

Figure 4:
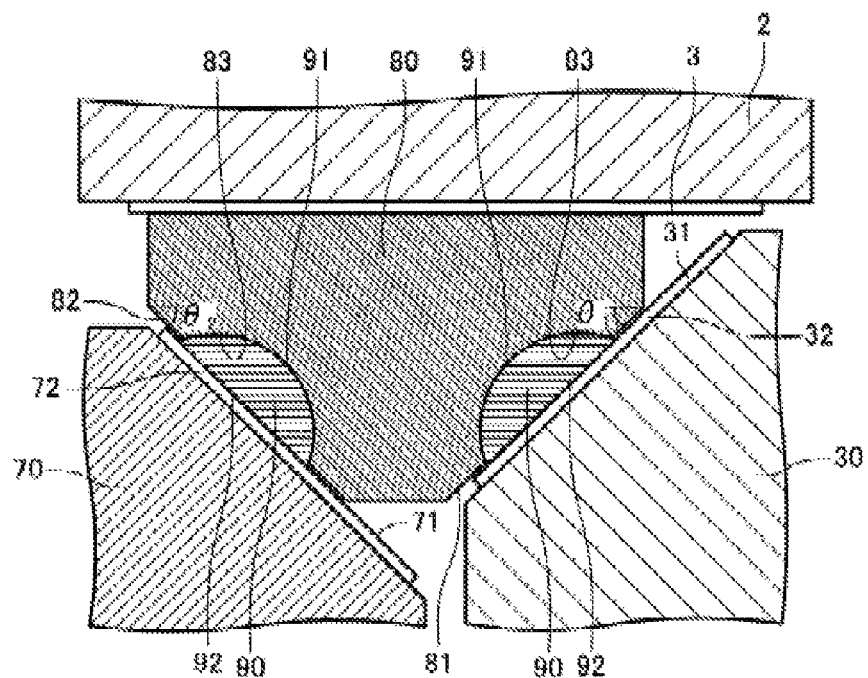
FIG. 4 is a detailed view of main portions of FIG. 3.

FIG. 4 is a detailed view of main portions of FIG. 3. FIG. 4 is an illustration of a state of the top dead center. The first inclined surfaces 81 and the second inclined surfaces 82 of the cam portions 80 each have a spherical concave portion 83, and spherical shoes 90 each having a convex lens shape are received in the concave portions 83. The spherical shoes 90 each have a spherical convex surface 91 and a flat surface 92, and are swingably received in the concave portions 83 so that the convex surfaces 91 are held in surface contact with the spherical surfaces of the concave portions 83. A thickness of the spherical shoe 90 is larger than a depth of the concave portion 83. Under a state in which the spherical shoes 90 are received in the concave portions 83, the flat surfaces 92 of the spherical shoes 90 protrude from the first inclined surfaces 81 and the second inclined surfaces 82. Spherical shoes similar to the spherical shoes 90 are also provided in the slide surfaces in which the balance weights 70 are held in contact with the frame 2.

Further, liners 32 having a small friction coefficient and being capable of withstanding a high surface pressure are provided to the inclined surfaces 31 of the adjustment screw 30, and similar liners 72 are also provided to the inclined surfaces 71 of the balance weights 70. As the liners 32 and 72, it is preferred that Teflon(trademark)-based composite material (for example, Teflon(trademark)-based impregnated porous bimetal) be used. Also on surfaces at which the frame 2 and the cam portions 80 are held in contact with each other and on which the cam portions 80 slide, liners 3 similar to the liners 32 and 72 are provided.

When the first inclined surfaces 81 of the cam portions 80 are pressed by the inclined surfaces 31, and a small angle is formed between the inclined surfaces (between the inclined surface 31 and the first inclined surface 81 and between the second inclined surface 82 and the inclined surface 71), or when a small angle is originally present between the inclined surfaces due to a component tolerance, the spherical shoes 90 turn (swing) in the concave portions 83 to absorb the difference in angle.

That is, in the dynamic balance device according to the first embodiment, the surface contact is maintained at portions at which the inclined surfaces 31 (liners 32) and the flat surfaces 92 of the spherical shoes 90 are held in abutment against each other and at portions at which the flat surfaces 92 and the inclined surfaces 71 (liners 72) are held in abutment against each other, thereby being capable of preventing the seizure and wear of the slide surfaces due to the linear contact (partial contact). Further, when the liners 32 and 72 are used for the inclined surfaces 31 and 71 to reduce the friction coefficient, generation of heat on the slide surfaces is reduced, thereby being capable of further preventing the seizure and wear of the slide surfaces, and enabling sliding even in a state in which the clearances with the slide surfaces are zero. With this configuration, the smooth drive can be performed even during the high-speed operation. Further, the thermal displacement of the bottom dead center position can be prevented by reducing the generation of heat on the slide surfaces.

In the first embodiment, an inclination angle $\theta_1$ of the first inclined surface 81 and an inclination angle $\theta_2$ of the second inclined surface 82 with respect to the cam portions 80 are set equal to each other (that is, stroke amounts of the slide 50 and the balance weights 70 are set equal to each other), and hence a mass $M_s$ of the slide 50 (which is herein a total mass of the adjustment screw 30 and the slide 50) and a mass $M_w$ of the balance weights 70 are set equal to each other. When the inclination angle $\theta_1$ and the inclination angle $\theta_2$ are set different from each other, it is only necessary that the items $\theta_1$, $\theta_2$, $M_s$, and $M_w$ be suitably set so as to satisfy the following expression.

$$\sin\theta_1 \times M_s = \sin\theta_2 \times M_w$$

Figure 5A:
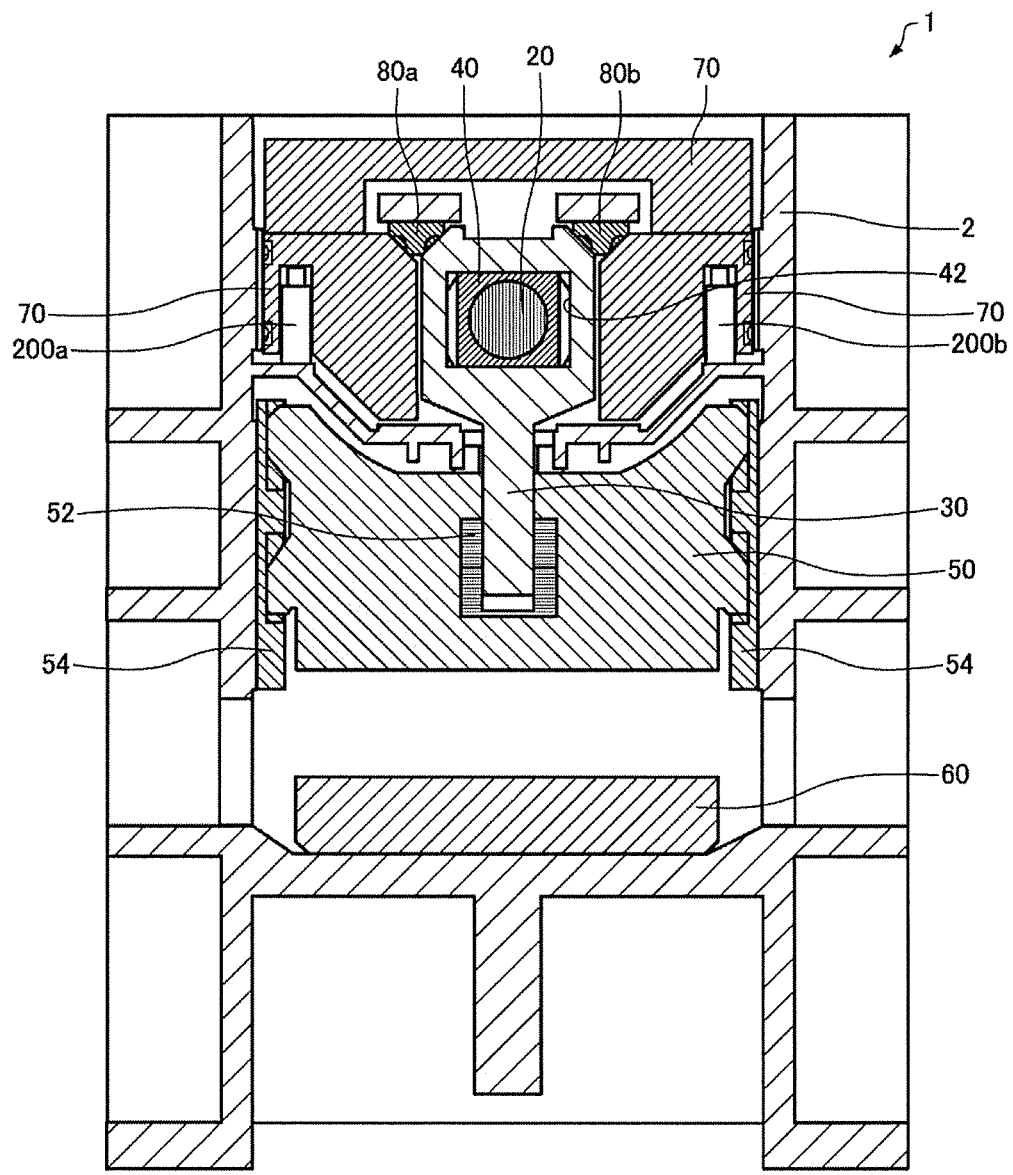
FIG. 5A is a partial sectional front view of the press machine including the dynamic balance device, in which urging members for urging balance weights in an upward direction are provided and in which second cam portions are omitted.
Figure 5B:
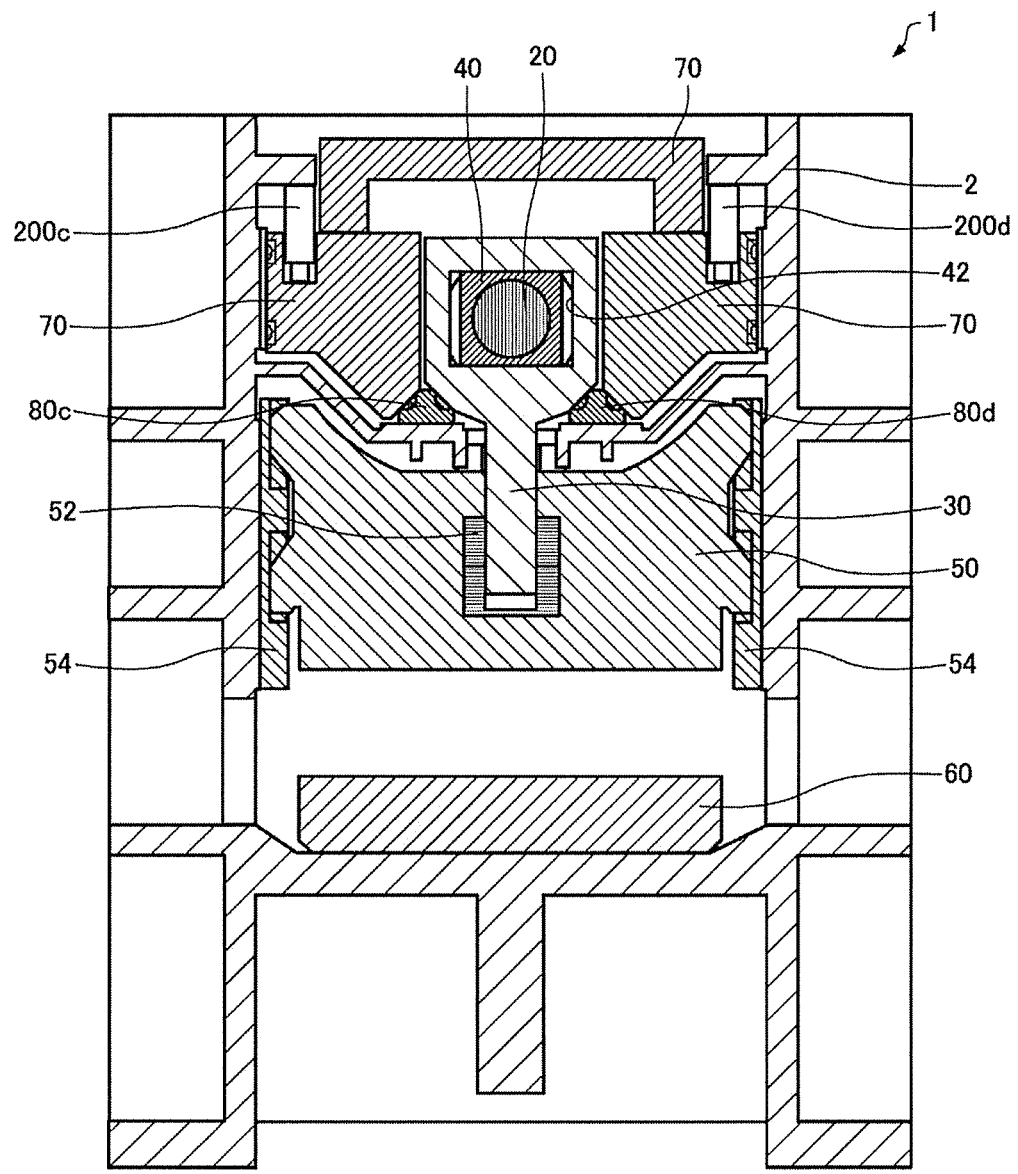
FIG. 5B is a partial sectional front view of the press machine including the dynamic balance device, in which urging members for urging the balance weights in a downward direction are provided and in which first cam portions are omitted.

Further, the first cam portions (cam portions 80a and 80b) or the second cam portions (cam portions 80c and 80d) may be omitted. When the cam portions 80a and 80b are omitted, urging members such as gas springs for urging the balance weights 70 in the downward direction may be provided. When the cam portions 80c and 80d are omitted, urging members for urging the balance weights 70 in the upward direction may be provided. FIG. 5A is a partial sectional front view of the press machine including a dynamic balance device in which gas springs 200a and 200b for urging the left and right balance weights 70 in the upward direction are provided to the frame 2 and in which the cam portions 80c and 80d of FIG. 1 are omitted. In the example illustrated in FIG. 5A, when the slide 50 moves in the upward direction (first direction), the balance weights 70 are moved by the cam portions 80a and 80b in the downward direction (third direction). When the slide 50 moves in the downward direction (third direction), the balance weights 70 urged by the gas springs 200a and 200b move in the upward direction (first direction). Alternatively, as illustrated in FIG. 5B, there may be employed a configuration of including a dynamic balance device in which gas springs 200*c* and 200*d* for urging the left and right balance weights 70 in the downward direction are provided to the frame 2 and in which the cam portions 80*a* and 80*b* of FIG. 1 are omitted. FIG. 5B is a partial sectional front view of the press machine, similarly to FIG. 5A. In this case, when the slide 50 moves in the downward direction (third direction), the balance weights 70 are moved by the cam portions 80*c* and 80*d* in the upward direction (first direction). When the slide 50 moves in the upward direction (first direction), the balance weights 70 urged by the gas springs 200*c* and 200*d* move in the downward direction (third direction).

Second Embodiment

Figure 6:
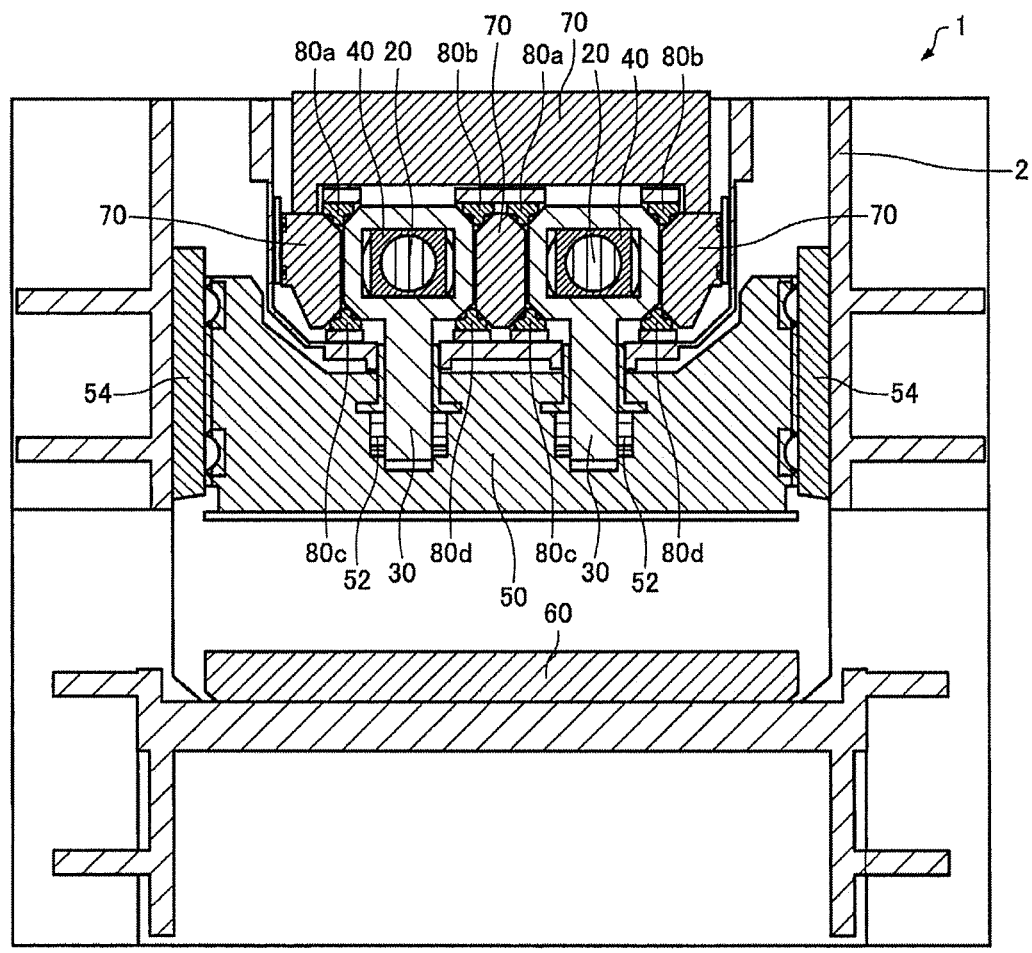
FIG. 6 is a partial sectional front view of a press machine including a dynamic balance device according to a second embodiment of the present invention.

FIG. 6 is a partial sectional front view of a press machine including a dynamic balance device according to a second embodiment of the present invention. In FIG. 6, configurations which are the same as the configurations of FIG. 1 are denoted by the same reference symbols, and description thereof is suitably omitted. FIG. 6 is an illustration of a state of a top dead center.

In the second embodiment, the basic configurations and functions are the same as those of the first embodiment. However, the press machine has a two-point structure unlike the first embodiment, and includes servomotors 10, crank shafts 20, sliders 40, adjustment screws 30, and cam portions 80*a* to 80*d* (first and second cam portions) in pairs, which are arranged so as to be separated in the horizontal direction.

The balance weight 70 provided on the left side in FIG. 3, the balance weight 70 provided at the center, and the balance weight 70 provided on the right side in FIG. 3 are coupled by the balance weight 70 provided on the upper side. The balance weight 70 provided at the center has four inclined surfaces 71 which are opposed to the cam portion 80*b* provided on the left side in FIG. 3, the cam portion 80*a* provided on the right side in FIG. 3, the cam portion 80*d* provided on the left side in FIG. 3, and the cam portion 80*c* provided on the right side in FIG. 3.

The pair of servomotors 10 are controlled so that the pair of crank shafts 20 are rotated in synchronization with each other in reverse directions, and the pair of slides 40 perform a circular motion in synchronization with each other in reverse directions. With this configuration, the pair of adjustment screws 30 vertically move in synchronization with each other.

When a pair of flywheels are used in place of the pair of servomotors 10, a mechanism which rotates the pair of crank shafts 20 in synchronization with each other (for example, gear, timing belt, or pulley) is provided. In the press machine 1 according to the second embodiment, during the operation of the press machine, the pair of adjustment screws 30 can be moved in synchronization with each other through intermediation of the balance weight 70 provided at the center. Thus, it is only necessary that the rotation of the pair of crank shafts 20 be synchronized with each other only at the time of activation from the top and bottom dead centers, thereby being capable of downsizing the mechanism which rotates the pair of crank shafts 20 in synchronization with each other.

Third Embodiment

Figure 7:
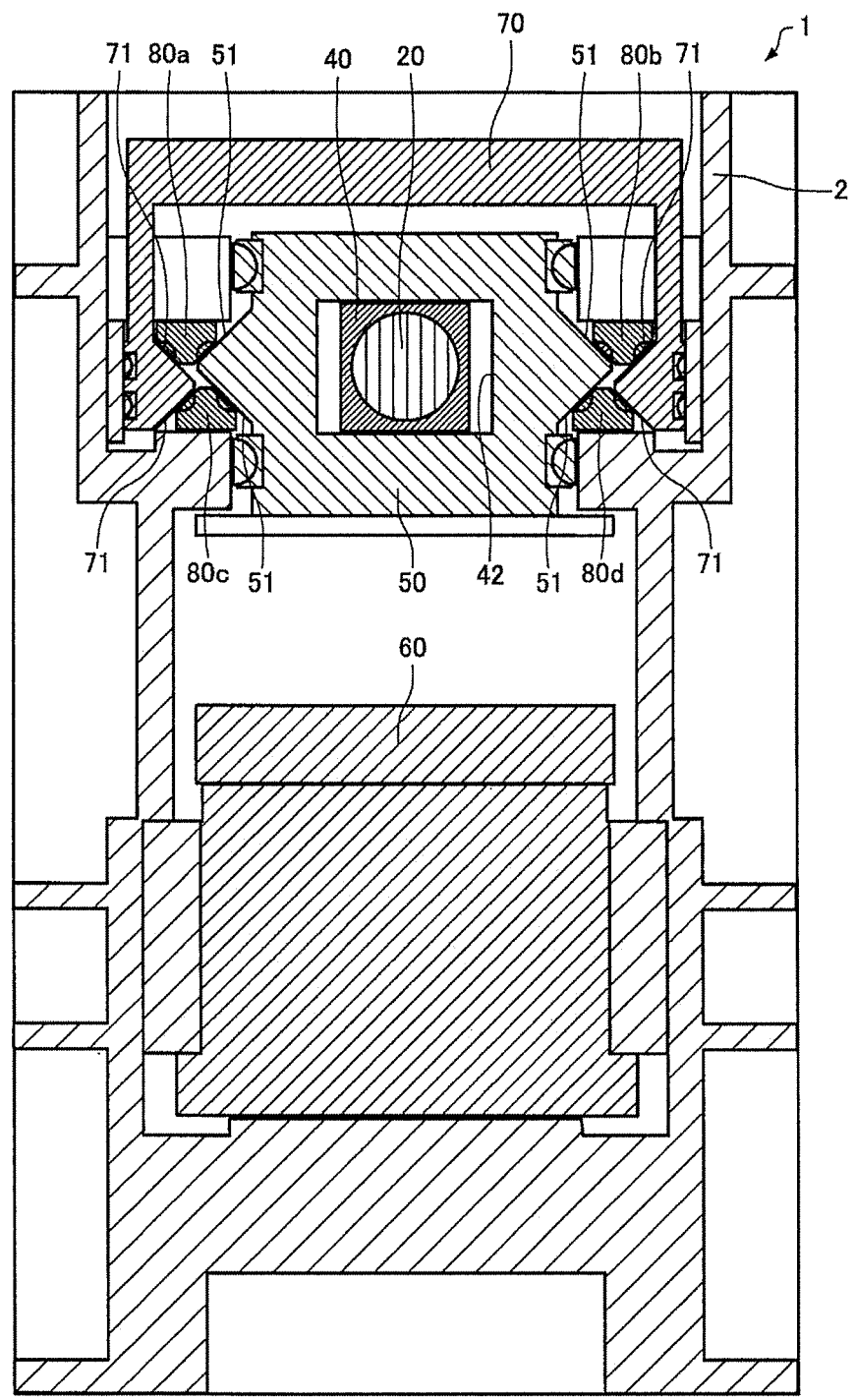
FIG. 7 is a partial sectional front view of a press machine including a dynamic balance device according to a third embodiment of the present invention.

FIG. 7 is a partial sectional front view of a press machine including a dynamic balance device according to a third embodiment of the present invention. In FIG. 7, configurations which are the same as the configurations of FIG. 1 are denoted by the same reference symbols, and description thereof is suitably omitted. FIG. 7 is an illustration of a state of a top dead center.

In the third embodiment, the basic configurations and functions are the same as those of the case of the first embodiment. However, unlike the first embodiment, the inclined surfaces opposed to the cam portions 80 are formed on the slide 50.

In the press machine of the third embodiment, the adjustment mechanism is provided in the bolster 60. Therefore, the adjustment screw 30 is omitted. Accordingly, the slide chamber 42 is formed in the slide 50. Further, the slide 50 has inclined surfaces 51 having inclination angles corresponding to the first inclined surfaces 81 of the cam portions 80 (80*a* to 80*d*). Therefore, the inclined surfaces 51 formed on the slide 50, the inclined surfaces 71 formed on the balance weights 70, and the cam portions 80 cause the vertical motion of the slide 50 to be converted into the moving force in the reverse direction to the vertical motion. With this configuration, the balance weights 70 vertically move with the phase shifted by 180 degrees with respect to the slide 50. Even with the configuration of the third embodiment, the technical effect which is the same as that of the first embodiment is achieved.

Fourth Embodiment

Figure 8:
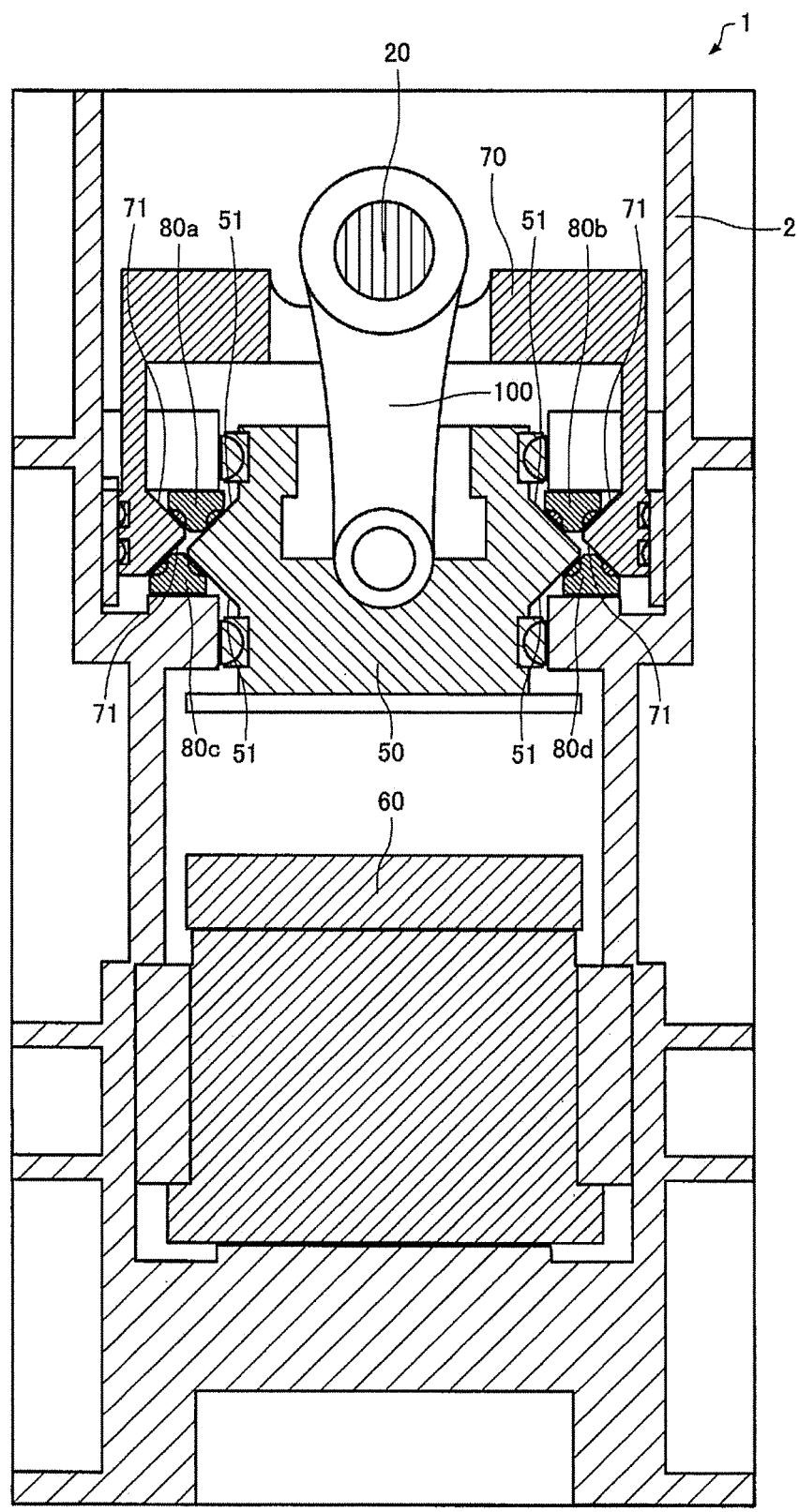
FIG. 8 is a partial sectional front view of a press machine including a dynamic balance device according to a fourth embodiment of the present invention.

FIG. 8 is a partial sectional front view of a press machine including a dynamic balance device according to a fourth embodiment of the present invention. In FIG. 8, configurations which are the same as the configurations of FIG. 1 are denoted by the same reference symbols, and description thereof is suitably omitted. FIG. 8 is an illustration of a state of a bottom dead center.

The basis configurations and functions of the fourth embodiment are the same as those of the case of the first embodiment. However, unlike the first embodiment, the rotational motion of the crank shaft 20 is converted into the vertical motion of the slide 50 by a connecting rod 100 (crank mechanism).

One end portion of the connecting rod 100 is turnably mounted to an outer periphery of the crank shaft 20, and another end portion of the connecting rod 100 is turnably coupled to the slide 50. Further, similarly to the third embodiment, the slide 50 has the inclined surfaces 51 having the inclination angles corresponding to the first inclined surfaces 81 of the cam portions 80 (80*a* to 80*d*). Therefore, the inclined surfaces 51 formed on the slide 50, the inclined surfaces 71 formed on the balance weights 70, and the cam portions 80 cause the vertical motion of the slide 50 to be converted into the moving force in the reverse direction to the vertical motion. With this configuration, the balance weights 70 vertically move with the phase shifted by 180 degrees with respect to the slide 50. Even with the configuration of the fourth embodiment, the technical effect which is the same as that of the first embodiment is achieved.

The embodiments of the present invention are described in detail above. However, those skilled in the art would readily appreciate that many modifications are possible in the embodiments without materially departing from the novel teachings and effects of the invention.

REFERENCE SIGNS LIST

1 press machine, 2 frame, 3 liner, 10 servomotor, 20 crank shaft, 30 adjustment screw, 31 inclined surface, 32 liner, 40 slider, 42 slide chamber, 50 slide, 51 inclined surface, 52 worm wheel, 54 slide guide, 60 bolster, 70 balance weight, 71 inclined surface, 72 liner, 80 cam portion, 81 first inclined surface, 82 second inclined surface, 83 concave portion, 90 spherical shoe, 91 convex surface, 92 flat surface, 100 connecting rod, 200*a*, 200*b*, 200*c*, 200*d* gas spring

The invention claimed is:

1. A dynamic balance device for a press machine which performs press working by converting a rotational motion of a crank shaft into a vertical motion of a slide, the dynamic balance device comprising:
    a plurality of cam portions which transmit the vertical motion of the slide to a balance weight to move the balance weight in a reverse direction of the vertical motion of the slide,
    the plurality of cam portions each being movable in a direction crossing a moving direction of the slide, and including: a first inclined surface having an inclination angle corresponding to an inclination angle of an inclined surface formed on the slide or on a member which is provided integrally with the slide and vertically moves together with the slide; and a second inclined surface having an inclination angle corresponding to an inclination angle of an inclined surface formed on the balance weight.

2. The dynamic balance device for a press machine according to claim 1,
    wherein the first inclined surface and the second inclined surface each have a spherical concave portion, and
    wherein the spherical concave portion receives a spherical shoe which has a convex lens shape in which one surface being a spherical convex surface and another surface being a flat surface so that the spherical convex surface is held in contact with a spherical surface of the spherical concave portion and the spherical shoe is swingable.

3. The dynamic balance device for a press machine according to claim 1,
    wherein, when the slide moves in a first direction, a first cam portion among the plurality of cam portions moves in a second direction crossing the first direction, and the balance weight moves in a third direction which is a reverse direction to the first direction; and
    wherein, when the slide moves in the third direction, a second cam portion among the plurality of cam portions moves in the second direction, and the balance weight moves in the first direction.

4. A press machine comprising:
    a slide, driven by a motor, which moves in a first direction and a second direction opposite to the first direction;
    a balance weight;
    a cam that converts a motion of the slide to move the balance weight for reducing mechanical vibration of the press machine, wherein
    the cam has a first inclined surface and a second inclined surface
    the slide or a member provided with the slide and moving together with the slide has a third inclined surface,
    the balance weight having a fourth inclined surface, and
    the first to fourth inclined surfaces are inclined with respect to the first and second directions
    the first to fourth inclined surfaces are so arranged that
        the first inclined surface faces the third inclined surface, and the second inclined surface faces the fourth inclined surface,
        when the slide is driven to move in the first direction, (1) the slide pushes the cam, (2) the cam slides on the third inclined surface to push the balance weight, and (3) the balance weight slides on the second inclined surface to move in the second direction.

5. The press machine according to claim 4, further comprising a gas spring that urges the balance weight in the first direction.

* * * * *